US012644034B2

(12) United States Patent
Haruna et al.

(10) Patent No.: US 12,644,034 B2
(45) Date of Patent: Jun. 2, 2026

(54) THERMALLY CONDUCTIVE SHEET

(71) Applicant: Tatsuta Electric Wire & Cable Co., Ltd., Osaka (JP)

(72) Inventors: Yuusuke Haruna, Kizugawa (JP); Hiroshi Tajima, Kizugawa (JP); Shigekazu Umemura, Kizugawa (JP); Kanoe Komatsu, Kizugawa (JP); Yuu Iihara, Kizugawa (JP); Junichi Kinoshita, Kizugawa (JP); Kiyoshi Iwai, Kizugawa (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 491 days.

(21) Appl. No.: 18/549,960

(22) PCT Filed: Mar. 11, 2022

(86) PCT No.: PCT/JP2022/010800
§ 371 (c)(1),
(2) Date: Sep. 11, 2023

(87) PCT Pub. No.: WO2022/191308
PCT Pub. Date: Sep. 15, 2022

(65) Prior Publication Data
US 2024/0150638 A1 May 9, 2024

(30) Foreign Application Priority Data
Mar. 12, 2021 (JP) ................................. 2021-040096

(51) Int. Cl.
C09K 5/14 (2006.01)
C08K 3/22 (2006.01)
C08K 3/28 (2006.01)

(52) U.S. Cl.
CPC .................. *C09K 5/14* (2013.01); *C08K 3/28* (2013.01); *C08K 2003/2237* (2013.01); *C08K 2201/001* (2013.01)

(58) Field of Classification Search
CPC .... C09K 5/14; C08K 3/28; C08K 2003/2237; C08K 2201/001
See application file for complete search history.

(56) References Cited

U.S. PATENT DOCUMENTS 11,781,053 B2 10/2023 Suzumura
2009/0143522 A1* 6/2009 Wang ...................... C08K 3/22
524/588

(Continued)

FOREIGN PATENT DOCUMENTS

CN 102134474 A 7/2011
CN 105264031 A 1/2016

(Continued)

OTHER PUBLICATIONS

International Search Report dated Mar. 29, 2022, issued in International Application No. PCT/JP2022/010800.

(Continued)

*Primary Examiner* — Bijan Ahvazi
(74) *Attorney, Agent, or Firm* — Rankin, Hill & Clark LLP

(57) ABSTRACT

It is an object of the present invention to provide a thermally conductive sheet that is excellent in thermally conductive property, has insulation property, has a low permittivity, and is excellent in designability. The thermally conductive sheet 1 comprises a binder component 11, titanium oxide, titanium nitride, and a thermally conductive filler 12 other than these, and a ratio of the titanium oxide to the total of the titanium oxide and the titanium nitride is 20 to 90% by mass. An L* value of a surface of the thermally conductive sheet 1 in the L*a*b* color system is preferably 41 or less. The total (Continued)

content of the titanium oxide and the titanium nitride is preferably 0.3 to 10.0 parts by mass based on the total amount 100 parts by mass of the thermally conductive filler 12.

7 Claims, 1 Drawing Sheet

(56)          References Cited

U.S. PATENT DOCUMENTS

| | | | | |
|---|---|---|---|---|
| 2015/0034858 A1* | 2/2015 | Raman | ..................... | C09K 5/14 |
| | | | | 264/328.2 |
| 2016/0152872 A1* | 6/2016 | Furuta | ........................ | C09J 7/38 |
| | | | | 252/75 |
| 2021/0017437 A1* | 1/2021 | Suzumura | .............. | C08G 77/04 |

FOREIGN PATENT DOCUMENTS

| | | | | | |
|---|---|---|---|---|---|
| JP | 2003509578 | | 3/2003 | | |
| JP | 2012076421 | A * | 4/2012 | .............. | C09J 11/04 |
| JP | 2007277405 | B | 9/2012 | | |
| JP | 2007277406 | B | 9/2012 | | |
| JP | 2009274929 | B | 8/2013 | | |
| JP | 2013225697 | A * | 10/2013 | ............. | H05K 1/056 |
| JP | 2012076421 | B | 5/2015 | | |
| KR | 20200125685 | A | 11/2020 | | |
| WO | 2001021393 | | 3/2001 | | |
| WO | WO-0121393 | A1 * | 3/2001 | ......... | H10W 40/251 |

OTHER PUBLICATIONS

Written Opinion dated Mar. 29, 2022, issued in International Application No. PCT/JP2022/010800.

* cited by examiner

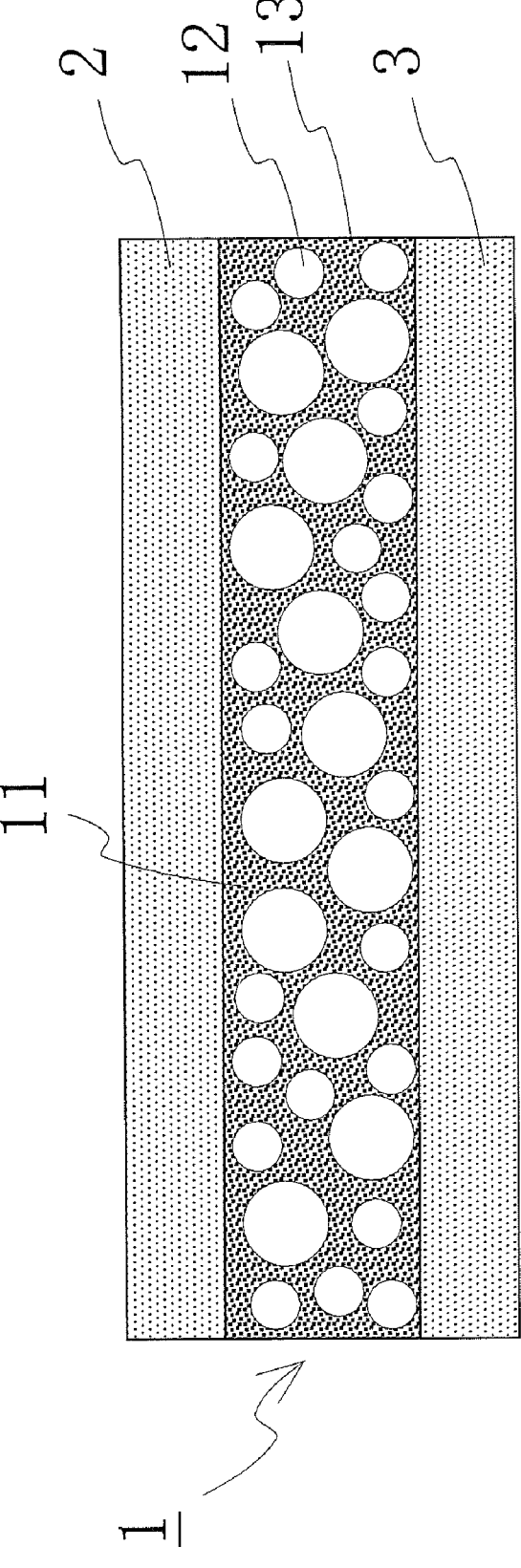

THERMALLY CONDUCTIVE SHEET

CROSS-REFERENCE TO RELATED APPLICATIONS

This application is the U.S. National Stage of International Application PCT/JP2022/010800 filed Mar. 11, 2022, the contents of which are incorporated by reference and the priority benefit of which is claimed. That application is based on Japanese Application JP 2021-040096 filed Mar. 12, 2021, the contents of which are incorporated by reference and the priority benefit of which is claimed.

TECHNICAL FIELD

The present invention relates to a thermally conductive sheet.

BACKGROUND ART

With the development of electronics, a large number of parts that generate heat in electronic equipment such as a power device and an arithmetic processing unit have been used in recent years. For the control of an electronic circuit, it is important to dissipate heat from these heat generation parts and thereby cool the whole system. A thermally conductive sheet (heat dissipation sheet) is arranged, for example, between a heat generation part and a heat dissipation fin or a metal plate, it is allowed to adhere to the heat generation part by pressure bonding so that any space should not be formed, and it shows thermally conductive property to transfer heat generated from the heat generation part to the heat dissipation fin or the like, and thus, it can carry out heat dissipation of the whole system.

The thermally conductive sheet is constituted of, for example, a thermally conductive inorganic filler and a resin. As the inorganic filler, inexpensive aluminum hydroxide or aluminum oxide (alumina); silicon carbide, boron nitride or aluminum nitride expected to have higher thermal conduction; or the like is used. As the resin, for example, an acrylic resin or a urethane resin is used.

As the thermally conductive sheets, for example, those disclosed in Patent Literatures 1 to 3 are known.

CITATION LIST

Patent Literature

Patent Literature 1
   Japanese Patent Laid-Open No. 2007-277405
Patent Literature 2
   Japanese Patent Laid-Open No. 2007-277406
Patent Literature 3
   Japanese Patent Laid-Open No. 2009-274929

SUMMARY OF INVENTION

Technical Problem

In recent years, thermally conductive sheets are required to have higher functionality, and those having more excellent thermally conductive property than ever are desired. As a method of improving thermally conductive property, increasing the blending amount of thermally conductive fillers, such as alumina or aluminum hydroxide, can be considered. However, if alumina or aluminum hydroxide is blended in a large amount, the thermally conductive sheet turns white, and there resides a problem of poor designability. In order to improve designability by making the thermally conductive sheet black, addition of carbon black that is widely used as a black colorant can be considered. However, if carbon black is added, electrically conductive property is imparted to the thermally conductive sheet, the permittivity is increased, and the insulation property is impaired. On this account, a thermally conductive sheet that is excellent in thermally conductive property, has insulation property, has a low permittivity, and is excellent in designability has been desired.

The present disclosure has been made in the light of the above, and it is an object of the present disclosure to provide a thermally conductive sheet that is excellent in thermally conductive property, has insulation property, has a low permittivity, and is excellent in designability.

Solution to Problem

In order to achieve the above object, the inventors of the present disclosure have earnestly studied, and as a result, have found that by incorporating a binder component, titanium oxide, titanium nitride, and a thermally conductive filler other than these into a thermally conductive sheet and setting a ratio of the titanium oxide to the total of the titanium oxide and the titanium nitride to be in a specific range, the thermally conductive sheet is excellent in thermally conductive property, has insulation property, has a low permittivity, and is excellent in designability. The present disclosure relates to a thermally conductive sheet that has been completed based on these findings.

That is to say, the present disclosure provides a thermally conductive sheet comprising a binder component, titanium oxide, titanium nitride, and a thermally conductive filler other than these, wherein:

a ratio of the titanium oxide to the total of the titanium oxide and the titanium nitride is 20 to 90% by mass.

An $L^*$ value of a surface of the thermally conductive sheet in the $L^*a^*b^*$ color system is preferably 41 or less.

The total content of the titanium oxide and the titanium nitride is preferably 0.3 to 10.0 parts by mass based on 100 parts by mass of the thermally conductive filler.

A content ratio of the total of the thermally conductive filler, the titanium oxide, and the titanium nitride is preferably 70 to 100% by mass based on the total amount of the thermally conductive sheet.

The binder component preferably comprises a silicone resin.

The thermally conductive sheet preferably has a relative permittivity of 15.0 or less.

The thermally conductive sheet preferably has a thermal conductivity of 4.8 W/mK or more in the plane direction.

A median diameter of the titanium oxide and the titanium nitride is preferably 15 nm or more.

The thermally conductive filler preferably comprises alumina, or alumina and aluminum nitride.

Advantageous Effects of Invention

The thermally conductive sheet of the present disclosure is excellent in thermally conductive property, has insulation property, has a low permittivity, and is excellent in designability.

BRIEF DESCRIPTION OF DRAWING

The FIGURE is a schematic sectional view of a thermally conductive sheet according to one embodiment of the present invention.

DESCRIPTION OF EMBODIMENT

[Thermally Conductive Sheet]

The thermally conductive sheet (heat dissipation sheet) according to one embodiment of the present disclosure contains at least a binder component, titanium oxide, titanium nitride, and a thermally conductive filler other than these.

The thermally conductive sheet may be in a form without a substrate (substrate layer), so-called "substrate-less", or may be a thermally conductive sheet provided on at least one side of a substrate. In the "substrate (substrate layer)", a release sheet that is peeled off when the thermally conductive sheet is used is not included.

The thermally conductive sheet may have a release sheet. The release sheet may be provided on only one surface of the thermally conductive sheet, or may be provided on both surfaces. Examples of the release sheets include a film formed of a low pressure-sensitive adhesive resin and a sheet having a substrate and a mold release-treated layer provided on at least one surface of the substrate. The release sheet is peeled off and removed when the thermally conductive sheet is used.

The FIGURE is a schematic sectional view showing one embodiment of the thermally conductive sheet of the present disclosure. As shown in the FIGURE, the thermally conductive sheet 1 contains a binder component 11 that is a matrix component, a thermally conductive filler 12 dispersed in the binder component 11, and a black colorant 13 containing titanium oxide and titanium nitride. On both surfaces of the thermally conductive sheet 1, a release sheet 2 and a release sheet 3 are provided, and the thermally conductive sheet 1 is sandwiched between the two release sheets 2 and 3.

(Binder Component)

The binder component is a component for forming a matrix of the thermally conductive sheet. Examples of the binder components include resins (binder resins), such as a thermoplastic resin, a thermosetting resin, and an active energy ray-curing resin. The binder components may be used singly, or may be used in combination of two or more.

Examples of the thermoplastic resins include a polystyrene-based resin, a vinyl acetate-based resin, a polyester-based resin, a polyolefin-based resin (e.g., a polyethylene-based resin, a polypropylene-based resin composition), a polyimide-based resin, and an acrylic resin. The thermoplastic resins may be used singly, or may be used in combination of two or more.

The thermosetting resins include both of a resin having thermosetting property (thermoset resin) and a resin obtained by curing the thermoset resin. Examples of the thermosetting resins include a silicone resin, a phenolic resin, an epoxy-based resin, a urethane-based resin, a urethane urea-based resin, a melamine-based resin, an alkyd-based resin, a polyimide-based resin, and an acrylic resin. The thermosetting resins may be used singly, or may be used in combination of two or more.

The active energy ray-curing resins include both of a resin capable of being cured by irradiation with an active energy ray (an active energy ray-curable resin) and a resin obtained by curing the active energy ray-curable resin. The active energy ray-curable resin is not particularly limited, but for example, a polymer of a polymerizable compound having at least two (meth)acryloyloxy groups in a molecule can be used. The active energy ray-curing resins may be used singly, or may be used in combination of two or more.

As the binder resin, the thermosetting resin is preferable among them, and from the viewpoint of excellent thermally conductive property, heat resistance, and insulation property, a silicone resin is more preferable. As the silicone resin, a well-known or commonly used silicone resin used for thermally conductive sheet can be used. The silicone resin is preferably a two-pack curable silicone resin from the viewpoint that the thermally conductive filler can be satisfactorily dispersed without using a solvent. The silicone resins may be used singly, or may be used in combination of two or more.

The content ratio of the binder component is preferably 1.0% by mass or more, more preferably 3.0% by mass or more, and still more preferably 5.0% by mass or more, based on the total amount 100% by mass of the thermally conductive sheet. When the content ratio is 1.0% by mass or more, the thermally conductive sheet is less likely to become brittle, and the film-forming property of the thermally conductive sheet is excellent. The content ratio is preferably 20.0% by mass or less, and more preferably 15.0% by mass or less. In particular, the content ratio of the silicone resin is preferably in the above range.

(Titanium Oxide, Titanium Nitride)

Titanium oxide and titanium nitride act as black colorants in the thermally conductive sheet, can make designability excellent, and can also act as thermally conductive fillers. Moreover, since titanium oxide and titanium nitride do not have electrically conductive property, they can improve designability without imparting electrically conductive property to the thermally conductive sheet. The titanium oxide and the titanium nitride may be each used singly, or may be each used in combination of two or more.

The titanium oxide and the titanium nitride contained in the thermally conductive sheet are particles. The titanium oxide and the titanium nitride are blended as particles that are independent of one another in the thermally conductive sheet. The titanium oxide and the titanium nitride may be surface-treated, but from the viewpoint of ensuring insulation property and designability, it is preferable that they have no surface-treated layer, such as a shell layer (core-shell structure) or a surface treatment agent.

A median diameter of the titanium oxide and the titanium nitride is preferably 15 nm or more, more preferably 25 nm or more, still more preferably 40 nm or more, and particularly preferably 50 nm or more. When the median diameter is 15 nm or more, the permittivity becomes lower. The median diameter is, for example, 100 nm or less, and preferably 80 nm or less. The median diameter is a median diameter in a particle size distribution of a mixture of the titanium oxide and the titanium nitride. The median diameter is a median diameter (D50) measured by a dynamic light scattering method.

The ratio of the titanium oxide to the total (100% by mass) of the titanium oxide and the titanium nitride is 20 to 90% by mass, preferably 30 to 80% by mass, and more preferably 35 to 55% by mass. Since the ratio is in the above range, the thermally conductive sheet can be sufficiently made black, and has excellent designability.

The total content of the titanium oxide and the titanium nitride in the thermally conductive sheet is preferably 0.3 to 10.0 parts by mass, more preferably 0.5 to 9.0 parts by mass, still more preferably 1.0 to 5.0 parts by mass, and particularly preferably 1.2 to 2.0 parts by mass, based on the total amount 100 parts by mass of the thermally conductive filler. When the content is 0.3 part by mass or more, the thermally conductive sheet can be sufficiently made black, and has more excellent designability. When the content is 10.0 parts by mass or less, the thermally conductive filler can be sufficiently blended, the thermally conductive sheet is excellent in thermally conductive property, and the film-forming property of the thermally conductive sheet is excellent.

(Thermally Conductive Filler)

The thermally conductive filler is particles having thermally conductive property other than titanium oxide and titanium nitride, and is a component that shows thermally conductive property in the thermally conductive sheet. Examples of the thermally conductive fillers include inorganic fillers, e.g., metal particles; metal oxides, such as alumina (aluminum oxide) and zinc oxide; nitrides, such as aluminum nitride and boron nitride; metal hydroxides, such as aluminum hydroxide; carbides, such as silicon carbide; silicon compounds, such as glass, silica, silicon carbide, and silicon (silicon); ceramic filler; and carbon materials, such as carbon fiber, carbon nanotube, and diamond. The thermally conductive fillers may be used singly, or may be used in combination of two or more.

The thermally conductive filler is preferably a metal oxide or a nitride, and among them, it more preferably contains a metal oxide, and from the viewpoint of more excellent thermally conductive property, it particularly preferably contains both of a metal oxide and a nitride. In particular, the metal oxide is preferably alumina, and the nitride is preferably aluminum nitride or boron nitride. When the thermally conductive filler contains a metal oxide and/or a nitride, the content of the metal oxide and/or the nitride in the thermally conductive filler is preferably 25% by mass or more, and more preferably 30% by mass or more. Although the upper limit is not particularly limited, it is preferably 100% by mass or less. When the thermally conductive filler contains both of a metal oxide and a nitride, the ratio of the metal oxide to the total of the metal oxide and the nitride is preferably 20 to 90% by mass, more preferably 30 to 70% by mass, and still more preferably 35 to 55% by mass. When the ratio is in the above range, the thermally conductive sheet has much more excellent thermally conductive property.

The metal oxide (particularly alumina) preferably has 2 or more peak tops in the particle size distribution, and more preferably has 2 peak tops therein. A metal oxide having 5 peak tops may be used. When the metal oxide has 2 peak tops (peak top A and peak top B), it preferably has the peak top A in the range of 2 to 30 μm, and it preferably has the peak top B in the range of 35 to 100 μm. When the metal oxide has the above 5 peak tops (peak tops C to G), it preferably has the peak top C in the range of 0.2 to 1 μm, it preferably has the peak top D in the range of more than 1 μm to 10 μm, it preferably has the peak top E in the range of more than 10 μm to 40 μm, it preferably has the peak top F in the range of more than 40 μm to 60 μm, and it preferably has the peak top G in the range of more than 60 μm to 100 μm. In this case, the filling property of the metal oxide in the thermally conductive sheet is more enhanced, and the thermally conductive property becomes more excellent.

The nitride (particularly aluminum nitride) preferably has 2 or more peak tops in the particle size distribution, and more preferably has 2 peak tops therein. It preferably has one of the above 2 or more peak tops in the range of 0.5 to 20 μm, and it preferably has another peak top in the range of 30 to 80 μm. In this case, the filling property of the nitride in the thermally conductive sheet is more enhanced, and the thermally conductive property becomes more excellent.

The shape of the thermally conductive filler is not particularly limited, and examples thereof include spherical (including true spherical and spheroidal), flaky (scaly), dendritic, lumpy, flat, needle-like, and amorphous (polyhedral) shapes. Among these, a spherical shape is preferable when the thermally conductive filler is a metal oxide, and a spherical shape and/or an amorphous (polyhedral) shape is preferable when the thermally conductive filler is a nitride, from the viewpoint that the filling property in the thermally conductive sheet is more enhanced, and the thermally conductive property becomes more excellent. As a spherical metal oxide, for example, Alumina Beads CB Series manufactured by Showa Denko Co., Ltd. can be used. As a spherical nitride, for example, RFS Series manufactured by Thrutek Applied Materials Co., Ltd. can be used. As an amorphous (polyhedral) nitride, for example, SFS Series manufactured By Thrutek Applied Materials Co., Ltd. can be used.

The thermally conductive filler may be surface-treated, or surface-untreated. As a surface treatment agent for the surface treatment, a silane coupling agent can be mentioned. When the thermally conductive filler is surface-treated with a silane coupling agent, dispersibility of the thermally conductive filler in the binder component (particularly silicone resin) that is a matrix of the thermally conductive sheet is good, and the filling property and the film-forming property become more excellent. The silane coupling agents may be used singly, or may be used in combination of two or more.

Examples of the silane coupling agents include silane coupling agents having a functional group other than an alkoxy group (functional group-containing silane coupling agents), such as β-(3,4-epoxycyclohexyl)ethyltrimethoxysilane, γ-glycidoxypropyltrimethoxysilane, and γ-glycidoxypropylmethyldiethoxysilane; and silane coupling agents not having a functional group other than an alkoxy group (functional group-free silane coupling agents), such as n-decyltrimethoxysilane. Among these, preferable are functional group-free silane coupling agents, more preferable are silane coupling agents in which a terminal other than an alkoxy group is an alkyl group (terminal alkyl group-containing silane coupling agents), and particularly preferable is n-decyltrimethoxysilane, from the viewpoint that the wettability with the thermally conductive filler is good, and improvement in bulk strength of the thermally conductive sheet and improvement in flexibility thereof can be expected.

The content ratio (total amount) of the thermally conductive filler in the thermally conductive sheet is preferably 70 to 98% by mass, and more preferably 80 to 95% by mass, based on the total amount 100% by mass of the thermally conductive sheet. When the content ratio is 70% by mass or more, the filling factor of the thermally conductive filler in the thermally conductive sheet is high, and the thermally conductive property becomes more excellent. When the content ratio is 98% by mass or less, the thermally conductive sheet is less likely to become brittle, and the film-forming property is excellent during the preparation of the thermally conductive sheet.

The content ratio of the total of the thermally conductive filler, the titanium oxide, and the titanium nitride in the thermally conductive sheet is preferably 70 to 98% by mass, more preferably 75 to 96% by mass, still more preferably 85 to 95% by mass, and particularly preferably 90 to 94% by mass, based on the total amount 100% by mass of the thermally conductive sheet. When the content ratio is 70% by mass or more, the filling property of the filler in the thermally conductive sheet is more enhanced, and the thermally conducive sheet is more excellent in thermally conductive property and designability. When the content ratio is 98% by mass or less, the thermally conductive sheet is less likely to become brittle, and the film-forming property is excellent during the preparation of the thermally conductive sheet.

The thermally conductive sheet may contain other components than the above-mentioned various components. Examples of the other components include a thixotropic agent, a dispersant, a curing agent, a curing accelerator, a curing retarder, a weak tackifier, a plasticizer, a flame retardant, an antioxidant, a stabilizer, and a colorant other than titanium oxide and titanium nitride.

From the viewpoint that the thermally conductive sheet has insulation property and is excellent in low permittivity and from the viewpoint that the curing inhibition of the binder component is suppressed, it is preferable that the thermally conductive sheet should not contain colorants other than titanium oxide and titanium nitride, such as a black colorant. The thermally conductive sheet may contain the other colorants as long as the effects of the present invention are not impaired. Examples of the other colorants include colorants having electrically conductive property, e.g., carbon materials such as carbon black and carbon nanotube. Since a colorant containing sulfur inhibits curing of the binder component, it is preferable that the thermally conductive sheet should not contain such a colorant. The content ratio of the other colorants is preferably 30 parts by mass or less, more preferably 10 parts by mass or less, still more preferably 5 parts by mass or less, and particularly preferably 1 part by mass or less, based on the total 100 parts by mass of the titanium oxide and the titanium nitride.
(Thermally Conductive Sheet)

The thickness of the thermally conductive sheet is, for example, 0.2 to 10 mm, and preferably 0.3 to 5 mm. The thermally conductive sheet can be prepared with good film-forming property even if it is thin, and it is suitable for use in small portable electronic equipment, so that the thickness is preferably 2.3 mm or less, more preferably 2 mm or less, still more preferably 1.2 mm or less, still much more preferably 1 mm or less, and particularly preferably 0.5 mm or less.

The thermal conductivity of the thermally conductive sheet in the plane direction is preferably 4.8 W/mK or more, and more preferably 5.0 W/mK or more. When the thermal conductivity is 4.8 W/mK or more, the thermally conductive sheet is more excellent in thermally conductive property and heat dissipation property.

The thermal conductivity of the thermally conductive sheet in the thickness direction is preferably 2.5 W/mK or more, and more preferably 2.6 W/mK or more. When the thermal conductivity is 2.5 W/mK or more, the thermally conductive sheet is excellent in thermally conductive property and heat dissipation property in the thickness direction.

The relative permittivity of the thermally conductive sheet is preferably 15.0 or less, more preferably 10.0 or less, and still more preferably 9.0 or less. When the relative permittivity is 15.0 or less, the thermally conductive sheet has insulation property, and the permittivity is sufficiently low. The relative permittivity is, for example, 3.0 or more.

The dielectric dissipation factor of the thermally conductive sheet is preferably 0.02 or less, and more preferably 0.01 or less. When the dielectric dissipation factor is 0.02 or less, transmission loss of high frequency signals that flow through a circuit or the like of electronic equipment such as an arithmetic processing unit can be suppressed.

The L* value of a surface of the thermally conductive sheet in the L*a*b* color system is preferably 41 or less, more preferably 40 or less, still more preferably 39 or less, and particularly preferably 38 or less. When the L* value is 41 or less, designability of the thermally conductive sheet is more excellent.

The total emissivity of the thermally conductive sheet, as measured regarding the wavelength range of 1700 nm to 5600 nm under the conditions of a temperature of 80° C. in accordance with JIS R 1693-2, is preferably 40% or more, more preferably 45% or more, and still more preferably 48% or more. When the total emissivity is 40% or more, the thermally conductive sheet is excellent in heat dissipation property.

A film-forming method for the thermally conductive sheet is not particularly limited, and a well-known or commonly used film-forming method for a film or a molding method for a molded product can be adopted. Above all, it is preferable to carry out film-forming by a roll-to-roll process, from the viewpoint that the sheet can be continuously formed, and the productivity is excellent.

The thermally conductive sheet can be produced by, for example, coating a substrate or a release-treated face of a release sheet with a composition containing the above-mentioned various components to form a coating layer, and thereafter drying or curing the layer by heating to form a sheet. The heating may be carried out in a state where a release-treated face of a release sheet is further laminated on the coating layer.

The composition contains the binder component, titanium oxide, titanium nitride, and the thermally conductive filler. The titanium oxide, the titanium nitride, and the thermally conductive filler may be mixed with the binder component after they are mixed in advance, or the titanium oxide, the titanium nitride, the thermally conductive filler, and the binder component may be mixed at the same time. The composition is preferably in the form of a paste containing no organic solvent.

A method for preparing a sheet of the composition is not particularly limited, and a known coating method, such as a sandwich method in which materials are placed between release sheets having been coated with a release agent and they are laminated by a roll laminator, a hot press molding machine, or an extruder, can be adopted.

EXAMPLES

The embodiment of the present disclosure will be described in more detail based on examples, but the invention of the present disclosure is in no way limited to these examples only. The content of each component described in the table is expressed in "part(s) by mass" unless otherwise noted.

Example 1

A mixture of alumina (a mixture of 23.9 parts by mass of spherical alumina having a median diameter of 45 μm and 17.5 parts by mass of spherical alumina having a median diameter of 10 μm) and aluminum nitride (a mixture of 34.6 parts by mass of spherical aluminum nitride having a median diameter of 55 μm and 23.0 parts by mass of polyhedral aluminum nitride having a median diameter of 2 μm) (mass ratio 58:42) and a mixture of titanium oxide and titanium nitride (mass ratio 40:60, median diameter: 20 nm) were mixed, thereby preparing a particle composition 1. The alumina and the aluminum nitride were surface-treated in advance with a silane coupling agent (trade name "Z-6210", manufactured by Dow Toray Co., Ltd., n-decyltrimethoxysilane) by stirring and mixing 1 part by mass of the silane coupling agent and 100 parts by mass of the particles in a solvent. The particle composition 1 was mixed with a mixture of a first agent and a second agent of a silicone resin (trade name "TSE-3062", manufactured by Momentive Performance Materials Inc.), thereby preparing a resin paste. Subsequently, the resin paste was arranged between release-treated faces of 2 release sheets, and they were laminated using a roll laminator, thereby preparing a laminate of [release sheet/resin paste layer/release sheet]. The laminate was heated at 70° C. for 30 minutes to thermally cure the resin paste layer, thereby preparing a thermally conductive sheet (thickness: 800 μm) of Example 1 as a laminate of [release sheet/thermally conductive sheet/release sheet].

Examples 2 to 5

Thermally conductive sheets of Examples 2 to 5 were prepared in the same manner as in Example 1, except that as the mixture of titanium oxide and titanium nitride, a mixture having a mass ratio between titanium oxide and titanium nitride and a median diameter that are each shown in Table 1 was used.

Example 6

A thermally conductive sheet of Example 6 was prepared in the same manner as in Example 1, except that 93.2 parts by mass of a mixture of 7.4 parts by mass of spherical alumina particles having a median diameter of 0.3 μm, 20.7 parts by mass of spherical alumina particles having a median diameter of 1.9 μm, 20.7 parts by mass of spherical alumina particles having a median diameter of 21 μm, 17.8 parts by mass of spherical alumina particles having a median diameter of 44 μm, and 26.6 parts by mass of spherical alumina particles having a median diameter of 73 μm were used as alumina, and the blending amounts of the titanium oxide, the titanium nitride, and the silicone resin were set as shown in Table 1, and aluminum nitride was not used.

Comparative Example 1

A thermally conductive sheet of Comparative Example 1 was prepared in the same manner as in Example 1, except that instead of the mixture of titanium oxide and titanium nitride, titanium oxide (median diameter: 300 nm) only was used.

Comparative Example 2

A thermally conductive sheet of Comparative Example 2 was prepared in the same manner as in Example 1, except that instead of the mixture of titanium oxide and titanium nitride, titanium oxide (median diameter: 35 nm) only was used.

Comparative Example 3

A thermally conductive sheet of Comparative Example 3 was prepared in the same manner as in Example 1, except that the blending amounts of the aluminum nitride and the alumina were changed as shown in Table 1, and instead of 1.4 parts by mass of the mixture of titanium oxide and titanium nitride, 1.0 part by mass of thermal black was used.

Comparative Example 4

A thermally conductive sheet of Comparative Example 4 was prepared in the same manner as in Example 1, except that aluminum nitride, titanium oxide, and titanium nitride were not used, 92.5 parts by mass of a mixture of 50.9 parts by mass of spherical alumina particles having a median diameter of 45 μm, 37 parts by mass of spherical alumina particles having a median diameter of 5 μm, and 4.6 parts by mass of spherical alumina particles having a median diameter of 0.2 μm were used, and the blending amounts were set as shown in Table 1.

Reference Example 1

As a thermally conductive sheet of Reference Example 1, trade name "Thermo-TranzUTW" (manufactured by WIDE WORK CORPORATION) was used.

Reference Example 2

As a thermally conductive sheet of Reference Example 2, trade name "Conductive Thermal Pad for CPU Cooling" (manufactured by Fosa) was used.
(Evaluation)
The thermally conductive sheets obtained in Examples, Comparative Examples, and Reference Examples were evaluated as stated below. The evaluation results are described in the table.
(1) Thermal Conductivity
The thermally conductive sheets were laminated to prepare a bulk body having a thickness of 1 mm or more, and using a thermophysical property measuring device (trade name "TA35", manufactured by Bethel Co., Ltd.), thermal diffusivity measurement was carried out by a laser flash method. Moreover, regarding the thermally conductive sheets, specific heat measurement at 25° C. was carried out by a DSC method using a differential scanning calorimeter (trade name "X-DSC7000" model, manufactured by Hitachi High-Tech Science Corporation). Furthermore, regarding the thermally conductive sheets, specific gravity measurement was carried out by a water displacement method using an electronic densimeter (trade name "EW-300SG", manufactured by Alfa Mirage Co., Ltd.). Then, by the calculation using the thermal diffusivity, the specific heat, and the specific gravity obtained above, a thermal conductivity was determined. Regarding the thermal conductivity, thermal conductivities in both the plane direction and the thickness direction were calculated.
(2) L* Value
Using a spectrophotometer (trade name "Ci64", manufactured by X-Rite, Inc.), surfaces of the thermally conductive sheets were measured. In the measuring method, SPIN and F2/10 were used. The L* value was measured using a color display method of the L*a*b* color system specified in JIS Z 8781-4.
(3) Permittivity
Regarding the thermally conductive sheets prepared in Examples, Reference Examples, and Comparative Examples, a relative permittivity (ε) and a dielectric dissipation factor (tan δ) were measured by a parallel plate method (conditions: 23° C., 1 GHz) using an impedance analyzer "E4991B" (manufactured by Keysight Technologies).
(4) Total Emissivity
Regarding the thermally conductive sheet of Comparative Example 4, the total emissivity was measured in the wavelength range of 1700 nm to 5600 nm under the conditions of a temperature of 80° C. in accordance with JIS R 1693-2.

TABLE 1

| | | Example | | | | | | Comparative Example | | | | Reference Example | |
|---|---|---|---|---|---|---|---|---|---|---|---|---|---|
| | | 1 | 2 | 3 | 4 | 5 | 6 | 1 | 2 | 3 | 4 | 1 | 2 |
| Thermally conductive filler | Aluminum nitride | 52.5 | 52.5 | 52.5 | 52.5 | 52.5 | — | 52.5 | 52.5 | 52.8 | — | — | — |
| | Alumina | 38.8 | 38.8 | 38.8 | 38.8 | 38.8 | 93.2 | 38.8 | 38.8 | 38.9 | 92.5 | — | — |
| Black colorant | Titanium oxide | 0.56 | 0.56 | 0.56 | 0.50 | 0.90 | 0.53 | 1.4 | 1.4 | — | — | — | — |
| | Titanium nitride | 0.84 | 0.84 | 0.84 | 0.90 | 0.50 | 0.80 | — | — | — | — | — | — |
| | Thermal black | — | — | — | — | — | — | — | — | 1.0 | — | — | — |
| Binder component | Silicone resin | 7.3 | 7.3 | 7.3 | 7.3 | 7.3 | 5.5 | 7.3 | 7.3 | 7.4 | 7.5 | — | — |
| [Titanium oxide/(titanium oxide + titanium nitride)], [% by mass] | | 40 | 40 | 40 | 36 | 64 | 40 | 100 | 100 | — | — | — | — |
| Median diameter of black colorant [nm] | | 20 | 62 | 67 | 51 | 38 | 62 | 300 | 35 | — | 62 | — | — |
| Thermal conductivity [W/mK] | Plane direction | 5.0 | 5.4 | 5.2 | 5.0 | 5.1 | 5.1 | 5.3 | 5.2 | 4.7 | 4.5 | 1.9 | 2.3 |
| | Thickness direction | 3.5 | 2.9 | 2.6 | 2.7 | 2.8 | 3.4 | 2.7 | 2.8 | 2.8 | 2.3 | 4.8 | 0.5 |
| L* value | | 37.47 | 36.08 | 36.53 | 38.42 | 40.44 | 26.48 | 46.26 | 41.22 | 37.44 | 92.27 | 30 | 29 |
| Relative permittivity | | 8.45 | 8.30 | 8.56 | 8.45 | 8.26 | 8.74 | 8.46 | 8.07 | 8.52 | 7.82 | N/A | 6.18 |
| Dielectric dissipation factor | | 0.009 | 0.008 | 0.008 | 0.008 | 0.008 | 0.001 | 0.008 | 0.007 | 0.009 | 0.001 | N/A | 0.030 |
| Total emissivity [%] | | — | — | — | — | — | — | — | — | — | 39 | — | — |

As can be seen from Table 1, the thermally conductive sheets of Examples each had a high thermal conductivity, were excellent in thermally conductive property, had a low permittivity, had insulation property, had a sufficiently low L* value, and were excellent in designability. Moreover, the dielectric dissipation factor was low. Furthermore, the total emissivity of each of the thermally conductive sheets of Examples was presumed to be 40% or more. On the other hand, in the case where titanium nitride was not used as a black colorant (Comparative Examples 1 and 2), the L* value was high, and the designability was poor. In the case where thermal black was used as a black colorant (Comparative Example 3), the thermal conductivity was low, and the thermally conductive property was poor. In the case where alumina was used as the thermally conductive filler, and titanium oxide and titanium nitride were not used (Comparative Example 4), the L* value was high, the thermally conductive property and the total emissivity were low, and the designability and the thermally conductive property were poor. The thermally conductive sheet of Reference Example 1 had a permittivity exceeding the measurement limit and had electrically conductive property, while the thermally conductive sheet of Reference Example 2 had a low thermal conductivity and was poor in thermally conductive property.

INDUSTRIAL APPLICABILITY

The thermally conductive sheet of the present invention can be used for electronic parts that are required to have heat dissipation effects.

REFERENCE SIGNS LIST

1 Thermally conductive sheet
2,3 Release sheet
11 Binder component
12 Thermally conductive filler
13 Black colorant

The invention claimed is:

1. A thermally conductive sheet, comprising:
a binder component,
titanium oxide and titanium nitride, and
a further thermally conductive filler,
wherein a ratio of the titanium oxide to the total of the titanium oxide and the titanium nitride is 20 to 90% by mass,
wherein the further thermally conductive filler comprises alumina and aluminum nitride, and
wherein the total content of the titanium oxide and the titanium nitride is 0.3 to 10.0 parts by mass based on 100 parts by mass of the titanium oxide and the titanium nitride and the further thermally conductive filler.

2. The thermally conductive sheet according to claim 1, wherein an L* value of a surface of the thermally conductive sheet in the L*a*b* color system is 41 or less.

3. The thermally conductive sheet according to claim 1, wherein a content ratio of the total of the further thermally conductive filler, the titanium oxide, and the titanium nitride is 70 to 98% by mass based on the total amount of the thermally conductive sheet.

4. The thermally conductive sheet according to claim 1, wherein the binder component comprises a silicone resin.

5. The thermally conductive sheet according to claim 1, wherein the thermally conductive sheet has a relative permittivity of 15.0 or less.

6. The thermally conductive sheet according to claim 1, wherein the thermally conductive sheet has a thermal conductivity of 4.8 W/mK or more in the plane direction.

7. The thermally conductive sheet according to claim 1, wherein a median diameter of the titanium oxide and the titanium nitride is 15 nm or more.

* * * * *